United States Patent Office 3,632,826
Patented Jan. 4, 1972

3,632,826
METHOD FOR PRODUCING SILYLALKYL MERCAPTANS WITH SILICON HYDRIDE GROUPS
Abe Berger, Schenectady, N.Y., assignor to General Electric Company
No Drawing. Filed Jan. 6, 1969, Ser. No. 789,396
Int. Cl. C07f 7/08
U.S. Cl. 260—448.2 N    10 Claims

ABSTRACT OF THE DISCLOSURE

Silylalkylmercaptans having silicon hydride groups are formed by reacting diolefinic materials with thioacids to form a monoolefinically unsaturated compound having a thioacid salt substituent. A silicon hydride having, as an additional substituent, a reducible group, is added across the single unsaturation of an olefinic compound to form an organosilicon compound with an alkylthioacid salt group, this compound being reduced by an alkali or alkaline earth metal aluminum hydride, to convert the thioacid salt to the mercaptan group and the reducible substituents on the silicon to hydride substituents. The novel compounds are used to modify RTV compositions.

BACKGROUND OF THE INVENTION

Related applications

The process of the present invention is related to the process described and claimed in the copending application of Abe Berger, Ser. No. 789,418, filed Jan. 6, 1969, now U.S. Pat. 3,565,937, filed of even date herewith and to the copending application of Abe Berger, Ser. No. 789,401, filed Jan. 6, 1969, filed of even date herewith, both applications being assigned to the same assignee as the present invention.

This invention is also related to the invention described and claimed in the copending application of Abe Berger, Ser. No. 796,633, filed Jan. 6, 1969, now U.S. Pat. 3,565,-935, filed of even date herewith.

Numerous methods have been proposed in the prior art for preparing mercaptoalkyl substituted silanes, For example, German Pat. No. 1,163,818 describes the reaction of a haloalkyl substituted silane with thiourea in ethanol, followed by the decomposition of the isothiouronium salt with ammonia to form the mercaptoalkyl substituent. However, the resulting organosilicon compound cannot be formed with a silicon hydride substituent by this process.

Other processes use the anti-Markownikoff addition of hydrogen sulfide to olefinic silanes. However, the mercaptoalkyl group formed according to this reaction can compete for additional olefinic silanes during the reaction and an excess of hydrogen sulfide, in liquid form, must be employed to prevent the competing reaction. The difficulty of handling and storing this excess reactive material is obvious. Additionally, this process will not result in the formation of silicon hydride substituted materials with a mercaptoalkyl substituent.

Various other methods are also known to the prior art, but none are capable of producing a mercaptoalkyl substituted organosilicon compound having silicon hydride groups.

SUMMARY OF THE INVENTION

In accordance with the present invention, a method has been developed for forming mercaptoalkyl substituted organosilanes having silicon hydride substituents employing processes resulting in product yields of from 85 to 95%.

The total process can best be illustrated by the following generic reactions:

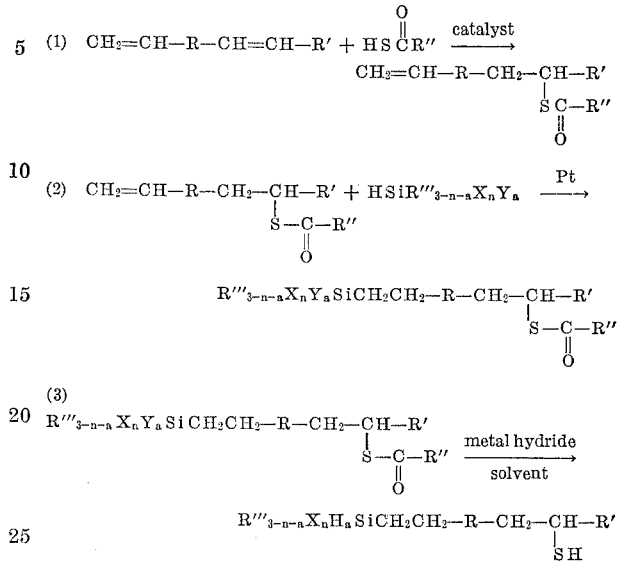

where R is a divalent, saturated alkyl group, R' is selected from the class consisting of monovalent saturated alkyl groups and hydrogen, the total number of carbon atoms in R and R', combined, being from 0 to 20; R" is a hydrocarbon radical of from 1 to 15 carbon atoms and is preferably an alkyl group of from 1 to 3 carbon atoms; R''' is selected from the class consisting of alkyl, aryl, and haloalkyl substituents, preferably those substituents having from 1 to 7 carbon atoms; X is selected from the class consisting of dilower ($C_1$-$C_4$) alkylamine, aminoxy, acetoxy, and oximino radicals; Y is selected from the class consisting of chloride, bromide, iodide and lower ($C_1$-$C_4$) alkoxy groups, $a$ is from 1 to 3, $n$ is from 0 to 2, the total of $a$ and $n$ being equal to or less than 3.

The reaction represented by Equation 1 is carried out with any of the various free radical catalysts at temperatures ranging from room temperature to 130° C., in the absence of a solvent.

The reaction represented by Equation 2 is carried out under the standard conditions employed for the addition of silicon hydride across the double bond of an olefin group, and employs the standard catalysts for this reaction.

The reduction carried out according to Equation 3 can employ either an alkali aluminum hydride or an alkaline earth aluminum hydride, with the reaction being carried out in a solvent, preferably by adding the organosilicon compound to the hydride. In this reaction, the hydride not only converts the thioacid salt to a mercaptan salt, but, additionally, reduces any halide or alkoxy substituents present on the silicon atom to hydrogen groups, thus forming the silicon hydride group, so as to form the product desired according to the process of the present invention. Thus, contrary to the processes of the prior art, organosilanes having both mercaptoalkyl substituents and silicon hydride groups can be formed according to the process of the present invention.

SUMMARY OF THE PREFERRED EMBODIMENTS

The alpha-omega diolefins, one of the possible reactants for the reaction according to Equation 1, are readily available through the thermal cracking procedures employed on cycloolefins and the oligomerization or co-oligomerization of butadiene. Each of these processes is well known in the art. In addition to the alpha-omega olefins, as noted above, the olefinic unsaturation can be at a position other than omega.

The diolefinic compound is reacted with a thioacid, according to the reaction described in Equation 1 in the absence of a solvent. In general, the reactants are employed in a stoichiometric ratio, though a 10% excess of either of the reactants is permissible. A catalyst is necessary for the reaction and, in general, can be any of the free radical catalysts known in the art. For example, the reaction can be conducted employing heat, ultraviolet light, peroxide, or an azo catalyst such as azobisisobutyronitrile. When a free radical catalyst other than heat or ultraviolet light is employed, the amounts are generally those catalytic amounts previously employed in the art.

The order of addition of the reactants in this reaction is not critical. It is preferable, however, to add the thioacid to the olefinically-substituted organosilicon compound in order to avoid any tendency of reaction between the olefinic groups. The time of addition is immaterial and the two reactants can, in general, be mixed together as quickly as desired. The reaction requires approximately 4 to 5 hours at room temperature, employing ultraviolet light. With higher temperatures and other catalysts, the reaction can proceed more quickly. Purification of the product produced according to the reaction of Equation 1 is preferred in order to prevent poisoning of the platinum catalyst in the reaction according to Equation 2. Such purification can be accomplished by a simple vacuum distillation.

The reaction of Equation 2, as noted previously, is a standard silicon hydride addition to the unsaturation of an olefinic group. The platinum to be employed as a catalyst in this reaction can be any of those previously employed in similar processes, and in the amounts generally used in such reactions.

Among the forms of platinum which can be employed are elemental platinum, as shown in U.S. Pat. No. 2,970,150—Bailey and platinum-on-charcoal, platinum-on-gamma-alumina, platinum-on-silica gel, platinum-on-asbestos, and chloroplatinic acid ($H_2PtCl_6 \cdot 6H_2O$) as mentioned in U.S. Pat. No. 2,823,218—Speier. Further, the platinum-containing materials can be selected from those having the formula $(PtCl_2 \cdot olefin)_2$ and $H(PtCl_3 \cdot olefin)$, as described in U.S. Pat. No. 3,159,601—Ashby. The olefin shown in the previous two formulas can be almost any type of olefin, but is preferably an alkene having from 2 to 8 carbon atoms, a cycloalkene having from 5 to 7 carbon atoms, or styrene. Specific olefins utilizable in the above formulas are ethylene, propylene, the various isomers of butylene, octylene, cyclopentene, cyclohexene, cycloheptene, etc. A further platinum-containing material usable in the composition of the present invention is the platinum chloride-cyclopropane complex $(PtCl_2 \cdot C_3H_6)_2$ described in U.S. Pat. No. 3,159,662—Ashby.

Still further, the platinum-containing material can be a complex formed from chloroplatinic acid with up to 2 moles per gram-atom of platinum of a member selected from the class consisting of alcohols having the formula AOH, ethers having the formula AOA', aldehydes having the formula ACHO, and mixtures of the above as described in U.S. Pat. No. 3,220,972—Lamoreaux. The substituent A in the above formulas is a member selected from the class consisting of alkyl radicals having at least 4 carbon atoms, alkyl radicals substituted with an aromatic hydrocarbon radical, and alkyl radicals substituted with an OA' group, where A' is a member selected from the class consisting of monovalent hydrocarbon radicals free of aliphatic unsaturation and monovalent radicals free of aliphatic unsaturation and consisting of carbon, hydrogen, and oxygen atoms, with each oxygen atom being attached to 2 atoms, at least one of which is a carbon atom, and up to one of which is a hydrogen atom.

The product produced according to Equation 2 need not be purified before proceeding with the reduction represented by the reaction of Equation 3. The metal hydride employed for reduction of the product produced according to the reaction of Equation 2 can be selected from the class consisting of alkali metal hydrides and alkaline earth metal hydrides, including sodium aluminum hydride, lithium aluminum hydride, and potassium aluminum hydride, in addition to the alkaline earth metal hydrides, such as calcium aluminum hydride, barium aluminum hydride, and strontium aluminum hydride. The preferred reducing agent, because of reactivity, is lithium aluminum hydride.

In the reduction, one hydrogen from the metal hydride is required for reduction of each halide or alkoxy group present on the silicon atom, and two hydrogen atoms are required for conversion of the thioacid salt to the mercaptan group. Preferably, a 5% excess over this required amount is employed in the reaction.

The reduction reaction is carried out in a solvent which remains for final purification of the product. The preferred solvent is an ether and can be any cyclic or alicyclic ether, but the preferred materials are diethyl ether, tetrahydrofuran, and diglyme. The ethers can be mixed in amounts of up to about 50% concentration with the usual hydrocarbons, such as hexane, heptane, cyclopentane, etc.

The reaction is preferably carried out by suspending the metal hydride in the solvent and adding the organosilane to the solution, with stirring. The final concentration of the mercaptoalkyl substituted silane in the solvent should preferably be about 1 to 2 molar.

The reaction is preferably carried out at about room temperature. As the reaction is exothermic it is necessary to continuously cool the mixture in order to maintain room temperature. The reaction is, essentially, instantaneous, and the rate of addition of the organosilicon material to the metal hydride in solution is determined only by the ability to maintain the temperature of the reaction mixture. Thus, the organosilicon material can be added as rapidly as desired, so long as the temperature of the reaction mixture does not deviate substantially from room temperature.

After the addition is completed a mixture of water and ice is added to hydrolyze and destroy any metal hydride remaining. A cold, hydrochloric acid solution is then added to convert the sulfur metal salt, substituted on the alkyl group, to the mercaptan group and the organic layer is then decanted from the reaction mixture.

The remaining reaction mixture is dried, by procedures well known in the art. For example, the drying can be accomplished with calcium sulfate, calcium chloride, or magnesium sulfate. The materials employed for drying are then removed, as by filtration, and the remaining material distilled to recover the desired product.

The invention will now be described in greater detail by referring to specific examples. All parts in the following examples, except as otherwise indicated, are by weight.

EXAMPLE 1

Preparation of 7-octenyl thioacetate

A reaction mixture was prepared containing 220.4 parts of 1,7-octadiene and 76.1 parts of thioacetic acid. The mixture was irradiated with ultraviolet light for about 4 hours at 25° C. A vapor phase chromatography scan was run of the resulting product and indicated the desired conversion to the 7-octenyl thioacetate. The reaction mixture was then fractionated and the product collected at 61° C. and 0.2 mm. pressure at a yield of 57%. An infrared spectrum of the product was consistent with the proposed structure:

(4) 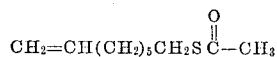

A further vapor phase chromatography scan of the product indicated that it was essentially pure.

EXAMPLE 2

Addition of organosilicon hydride to 7-octenyl thioacetate

A quantity of 50 parts of the 7-octenyl thioacetate, prepared according to Example 1, and 0.05 part of metallic platinum were placed in a reaction vessel and mechanically stirred. Over the course of 2 hours, 25.4 parts of dimethylchlorosilane were added to the mixture which was then heated to 90° C. and kept at this temperature for about 48 hours. The reaction mixture was then fractionated and the product collected at 120° C. and 0.2 mm. pressure in a yield of 60%. A vapor phase chromatography scan indicated that the product was essentially pure.

EXAMPLE 3

A quantity of 28 parts of the chlorodimethylsilyloctyl thioacetate in 200 parts of tetrahydrofuran is placed into a reaction vessel. In a separate vessel 5.7 parts of lithium aluminum hydride are dissolved in an equal volume of tetrahydrofuran. The lithium aluminum hydride solution was added slowly, with stirring, to the thioacetate over a period of about 1 hour, while the reaction mixture was cooled. Following this, the reaction mixture was refluxed for approximately 3 hours, after which it was cooled.

A quantity of 50 parts of finely chopped ice was placed in 50 parts of water and the mixture was added to the reaction vessel in order to decompose the excess hydride. This mixture was stirred for approximately 15 minutes, after which 100 parts of a 5% hydrochloric acid solution were added to solubilize the salts. The organic layer was separated by decantation and the product remaining was dried over calcium chloride.

The solids were filtered from the mixture and the filtrate was fractionated. An 80% yield of the product, boiling at 126° C. and 14 mm. pressure was obtained. An infrared spectrum of this material was taken and showed the typical hydride absorption at 4.71 microns, mercaptan absorption at 3.92 microns, and a lack of the 6 micron peak, which would have been indicative of the carbonyl of the starting material. The product was thus consistent with the structure:

(5)          $(CH_3)_2HSi(CH_2)_8SH$

EXAMPLE 4

A quantity of 82 parts of 1,4-hexadiene is placed in a reaction vessel with 105 parts of the thioacid:

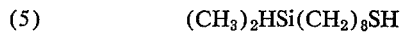

$$HS\overset{O}{\overset{\|}{C}}-C_3H_8$$

This mixture is stirred at a temperature of 100° C. for approximately 5 hours. After removal of remaining thiolacetic acid, a quantity of 181 parts of the organosilicon hydride:

$$(C_6H_5)(CH_3CH_2)(CH_3O)SiH$$

is added to the reaction vessel along with 0.002 part of platinum-on-charcoal catalyst, as platinum, as described in the aforementioned Speier patent. This mixture is stirred for approximately 2 hours at a temperature of 100° C. and is then cooled to room temperature. A quantity of 42 parts of sodium aluminum hydride is placed in a solvent mixture of 800 parts of diethyl ether and 700 parts of cyclohexane. The reaction vessel containing this mixture is placed in an ice bath and the thioacid salt prepared according to the previous reaction is added, slowly, so as to maintain the overall mixture at room temperature. A quantity of 500 parts of finely chopped ice and 500 parts of water are then mixed and added to the reaction vessel after which approximately 1000 parts of a 10% solution of hydrochloric acid are added. The resulting organic layer is decanted from the mixture, the remaining reaction product dried, filtered, and fractionally distilled to yield a product having the formula:

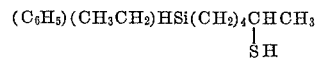

EXAMPLE 5

In the same manner as in the previous example, 68 parts of alpha,omega-pentadiene are reacted with 76 parts of thiolacetic acid. The remaining thiolacetic acids is removed. A quantity of 115 parts of methyldichlorosilane is added, along with elemental platinum catalyst, as in Example 3. This reaction product is treated in the same manner as in Example 3, with 40 parts of lithium aluminum hydride and the product, recovered in the same manner, has the structure:

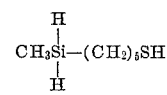

The products produced according to the method of this invention are useful in the formation of organopolysiloxanes, as by silicon hydride-SiOH additions, as are known in the art. Such products have known utility, as, for example, metal protectants, as disclosed and claimed in U.S. Pat. No. 3,346,405 of R. V. Viventi, assigned to the same assignee as the present invention. Additionally, because of the adaptability of these products to the SiH-SiOH additions, they are also useful in room temperature vulcanizing organopolysiloxane elastomer compositions in which mercaptoalkyl groups are desired. The formation of room temperature vulcanizing compositions are described, for example, in U.S. Pat. No. 2,843,555—Berridge and U.S. Pat. No. 3,127,363—Nitzsche et al.

The platinum catalyst employed in the addition of the silicon hydride to the olefin group is not poisoned by the reduction reaction employing the metal hydride and, thus, is available for further activity, if desired. Thus, a versatile process has been shown for the production of a wide variety of monomeric organosilicon compounds substituted with both mercaptoalkyl and silicon hydride groups.

I claim:

1. A method for producing organosilicon compounds having both mercaptoalkyl and silicon hydride substituents of formula:

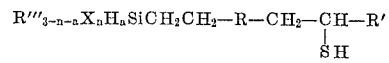

comprising reacting a diolefinic compound of formula:

$$CH_2=CH-R-CH=CH-R'$$

with a thioacid of formula:

adding to the reaction product an organosilicon hydride of formula:

$$HSiR'''_{3-n-a}X_nY_a$$

and treating the second reaction product with a metal hydride selected from the class consisting of alkali metal aluminum hydrides and alkaline earth metal aluminum hydrides, where R is a divalent, saturated hydrocarbon group, R' is selected from the class consisting of monovalent, saturated hydrocarbon groups and hydrogen, the total number of carbon atoms in R and R', combined, being from 0 to 20; R'' is a hydrocarbon group of from 1 to 15 carbon atoms; R''' is selected from the class consisting of alkyl, aryl, and haloalkyl groups; X is selected from the class consisting of dialkylamine, aminoxy, acetoxy, and oxamino groups; Y is selected from the class consisting of halo and lower alkoxy groups; $a$ is from 1 to 3, $n$ is from 0 to 2, and the total of $a$ and $n$ is a maximum of 3.

2. The method of claim 1 wherein R'' is an alkyl group of from 1 to 3 carbon atoms and R''' is selected from the class consisting of alkyl, aryl, and haloalkyl groups with from 1 to 7 carbon atoms.

3. The method of claim 1 wherein Y is chloride.

4. The method of claim 1 wherein the metal hydride is lithium aluminum hydride.

5. The method of producing:

$$Me_2HSi(CH_2)_8SH$$

comprising reacting alpha,omega-octadiene with thioacetic acid, adding chlorodimethylsilane to the reaction product to form a second reaction product, and treating the second reaction product with lithium aluminum hydride.

6. An organosilicon compound having both mercaptoalkyl and silicon hydride substituents of the formula, $$R'''_{3-n-a}X_nH_aSiCH_2CH_2-R-CH_2\underset{\underset{SH}{|}}{CH}-R'$$

where R is a divalent, saturated hydrocarbon group, R' is selected from the class consisting of monovalent saturated hydrocarbon groups and hydrogen, the total number of carbon atoms in R and R', combined being from 0 to 20; R''' is selected from the class consisting of alkyl, aryl and haloalkyl groups; X is selected from the class consisting of dialkylamine, aminoxy, acetoxy and oxamino groups; $a$ is from 1 to 3, $n$ is from 0 to 2, and the total of $a$ plus $n$ is a maximum of 3.

7. The compound of claim 6 wherein R''' is selected from the class consisting of alkyl, aryl and haloalkyl groups with from 1 to 7 carbon atoms.

8. The compound of claim 6 wherein $y$ is chloride.

9. The compound of claim 6 wherein the compound has the structure, $$(CH_3)_2HSi(CH_2)_8SH$$

10. The compound of claim 6 wherein the compound has the structure, $$(C_6H_5)(CH_3CH_2)HSi(CH_2)_4\underset{\underset{SH}{|}}{CH}CH_3$$

References Cited

UNITED STATES PATENTS

| | | | |
|---|---|---|---|
| 2,944,942 | 7/1960 | Charle et al. | 260—448.8 X |
| 3,392,182 | 7/1968 | Koerner | 260—448.8 |
| 3,465,015 | 9/1969 | Speier | 260—448.2 N |

TOBIAS E. LEVOW, Primary Examiner

P. F. SHAVER, Assistant Examiner

U.S. Cl. X.R.

260—46.5 G, 448.2 E, 448.8 R